United States Patent [19]

Aron et al.

[11] 4,427,994

[45] Jan. 24, 1984

[54] COLOR SEPARATOR FOR A VIDEO DISPLAY GENERATOR

[75] Inventors: Mitchell Aron, Harrington Park; Rover, Jr., Ralph R., Cresskill, both of N.J.

[73] Assignee: The Bendix Corporation, Teterboro, N.J.

[21] Appl. No.: 358,151

[22] Filed: Mar. 15, 1982

[51] Int. Cl.³ .............................................. H04N 9/11
[52] U.S. Cl. ..................................................... 358/54
[58] Field of Search ...................... 358/54, 332, 53, 55, 358/75

[56] References Cited

U.S. PATENT DOCUMENTS 3,585,282  6/1971  Allan ..................................... 358/55

Primary Examiner—John C. Martin
Assistant Examiner—J. Sutherland
Attorney, Agent, or Firm—Anthony F. Cuoco; Stanley N. Protigal; Joseph E. Funk

[57] ABSTRACT

A Color Separator for a Map Display Video Generator utilizing a Fresnel lens to expand a multicolor light signal output from a point of light scanned map film to a stationary area that entirely fills an input end of a bundle of optical fibers the other end of which bundle is divided into three smaller bundles. The light output from each smaller bundle is first passed through a colored filter to thereby separate the light into the primary colors red, green and blue. The separated light is then converted to an electrical signal by photomultipliers and used to generate a color video signal applied to a color cathode ray tube display to display the map thereon.

9 Claims, 2 Drawing Figures

COLOR SEPARATOR FOR A VIDEO DISPLAY GENERATOR

BACKGROUND OF THE INVENTION

This invention relates to a display system for displaying video images on a color cathode ray tube.

The invention more particularly relates to a color separator used with a multicolor film display system for displaying the film on a color television type display unit.

In the prior art the technique most commonly used to separate colors of colored light signals is to use dichroic mirrors. Dichroic mirrors typically transmit a narrow band of wavelengths of light while reflecting all other wavelengths of light. In certain color television applications dichroic mirrors are typically used which respectively transmit red, blue and green light. These are combined in a manner well known in the art to separate the red, blue and green components of light for further processing to make up a raster scan color video signal used to provide a display on a color cathode ray tube. These dichroic mirror color separators are relatively expensive and require a relatively large amount of space. Thus, there is a need for a color separator that is relatively small and inexpensive compared to prior art dichroic mirror separators.

SUMMARY OF THE INVENTION

The foregoing needs of the art are satisfied by our novel three color separator which utilizes a bundle of optical fibers, three color filters and an inexpensive simple optical lens, all located in a relatively small space. In the preferred embodiment of our invention described herein our novel color separator is utilized in a moving map film display system. The moving map film display system has a color film strip of which individual film frames each contain a colored map segment. In operation a portion of a map segment on a selected film frame is scanned by a white light beam from a flying spot scanner which is focused to a point on the surface of the film. The scanning may advantageously be a raster scan having a scan rate matching that of a raster scan cathode ray tube display upon which the scanned portion of the map segment is displayed. As the focused light beam is caused to scan the colored film, different colors of light at varying intensity are transmitted therethrough depending on the color and density of the film at each spot the light beam strikes. Immediately behind the film frame being scanned is located our novel color separator. The optical lens acts to cause the moving point of light of the flying spot scanner to remain stationary relative to the input end of the fiber optic separator. This lens is also configured so that the moving point always more or less fills the input end of the fiber optic separator. Because the moving point is stationary and always fills the input end of the fiber optic separator, the separator contributes no objectionable modulation component or "channel signature". The other end of the bundle is divided into three smaller bundles of fibers and the light entering the input end of the bundle is more or less equally divided between the three smaller bundles. Interposed in the path of the light exiting from the end of each of the three smaller bundles of optical fibers is a colored filter each of which transmits only a band of frequencies corresponding to the three color television primary colors red, blue or green used to make up a video signal used to drive a television type color cathode ray tube display. Each of these primary colors selected by the colored filters is converted to an electrical signal by a respective photomultiplier and the three electrical signals are then further processed in a manner well known in the art to make up a video signal that can drive a television type raster scan display to display in color the portion of the map segment scanned by the flying spot scanner. Note that since the moving point is stationary at the input end of the separator, it remains so at each of the three output ends. Thus, the moving point of the flying spot scanner also remains stationary on the photomultiplier sensing surface. Thus, there is created no objectionable photomultiplier signature that might otherwise be caused by a nonuniform sensing surface on the photomultiplier.

DESCRIPTION OF THE DRAWING

Our invention will be greater understood upon reading the following detailed description in conjunction with the drawing in which.

DETAILED DESCRIPTION OF THE INVENTION

Figure 1:
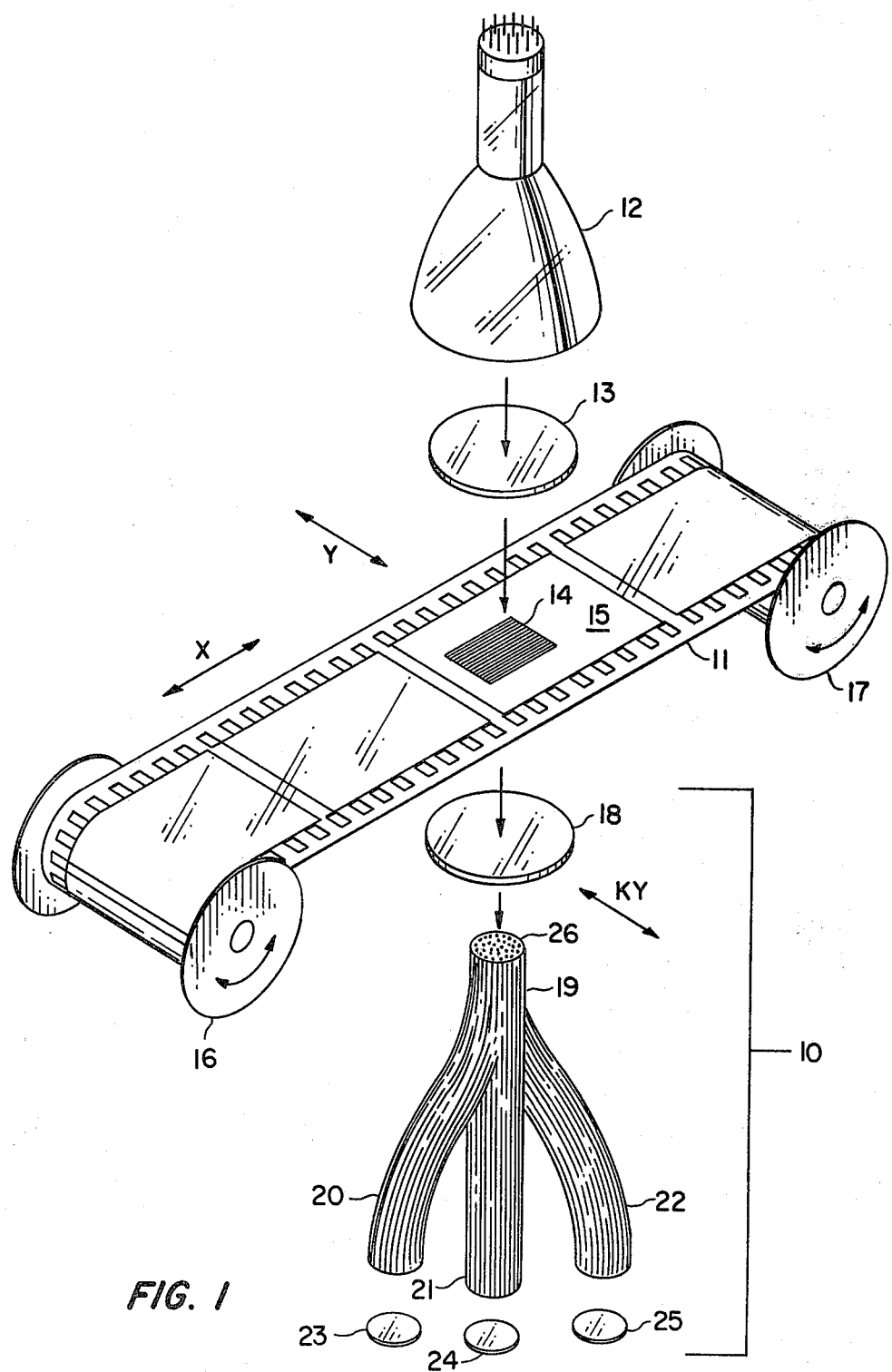
FIG. 1 shows a simplified film scanning arrangement utilizing our novel color separator.

In FIG. 1 is shown a simplified version of our novel color separator 10 functioning with a multicolor film display which has many prior art elements including a film strip 11 on which are frames of information or maps in color and a scanning mechanism including flying spot scanner 12 and imaging lens 13. In this embodiment of our invention each of the film frames, such as frame 15, on film strip 11 contain colored maps which are to be displayed to provide a moving map display on a raster scan television type color monitor (not shown) located on a moving craft, such as in the cockpit of a high speed aircraft. In a manner well known in the art, the position of the high speed aircraft is determined by navigational equipment thereon (not shown but well known in the art), which equipment provides an output signal indicating the position of the aircraft on or over the surface of the earth at each moment in time. This positional information is input to a moving map display system utilizing our novel color separator 10, and the information is used by equipment in the display system to cause the raster scan of a portion of a map segment on a film frame of film strip 11 and the subsequent generation of a television type raster scan video signal which when applied to a raster scan television monitor in the cockpit of the aircraft typically shows the aircraft at the middle of the display on the monitor along with the terrain around the aircraft. Details of such a moving map display are well known in the art and are not shown or described herein in detail to avoid detracting from an understanding of the present invention.

As the aircraft moves the moving map display on the monitor in the aircraft cockpit continuously changes to show the terrain around the aircraft at each moment in time. To provide the moving map display, equipment in the display system responds to the navigational information to rotate spools 16 and 17 and thereby move film strip 11 in the X coordinate direction to properly position scanned area 14 on an appropriate map frame 15 of film strip 11. To accomplish motion in the Y coordinate direction, the flying spot scanner 12 and imaging lens 13 are moved via a servo mechanism responsive to the positional information from the navigational equipment to position raster 14 on film frame 15 in the Y direction. As an alternative, the raster could be moved on flyng spot scanner 12. Thus, between the rotation of spools 16 and 17 with a servo mechanism responsive to positional information from the navigation system, and moving flying spot scanner 12 and imaging lens 13 via another servo mechanism responsive to positional information from the navigational system, small raster 14 is positioned anywhere on one of the map frames, such as frame 15, on film strip 11 to generate the moving map display on the television type monitor in the cockpit of the aircraft.

Selected portions of the information or maps on the frames of film strip 11 are converted to a light signal by the cooperation of flying spot scanner 12 and imaging lens 13. In a manner well known in the art, flying spot scanner 12 generates a scanning light beam of white light. Imaging lens 13 is utilized to focus the scanning light beam output from flying spot scanner 12 into a moving point of light scanning a small raster on area 14 of frame 15 on film strip 11. As the point of white light scanning the small area 14 of film frame 15 strikes particular colors on the film, different colors of light exit from the film to strike field lens 18 which is advantageously a thin lens, and more particularly a Fresnel lens. Fresnel lens 18 is a part of our novel color separator 10 and is described in more detail further in this specification. Another part of our novel color separator 10 is a bundle of optical fibers 19 having one end 26 comprising all optical fibers grouped together in a single bundle. The other end of the optical fibers making up bundle 19 are separated into three more or less equal smaller bundles 20, 21 and 22 by each having substantially the same number of optical fibers as shown in FIG. 1. Immediately adjacent to the ends of the optical fibers making up smaller bundles 20, 21 and 22 are respectively three color filgers 23, 24 and 25 as shown. In this embodiment of our invention colored filter 23 is a red filter, colored filter 24 is a green filter, and colored filter 25 is a blue filter. These three colors are chosen because they are the primary colors used to make up a typical raster scan type full color television signal.

Fresnel lens 18 is utilized to expand the moving point of light passing through film frame 15 to a larger area that is more or less equal to the area of the input end 26 of optical fiber bundle 19. Without lens 18 severe uniformity requirements are imposed on the fiber optic separator. If the point of light passing through area 14 of film frame 15 is allowed to directly strike only one point or only a small portion of the end 26 of optical fiber bundle 19 the intensity of the light output from smaller bundles 20, 21 and 22 are not uniform as the raster is scanned. This nonuniformity would create a stationary background that is objectionable. This occurs because it is functionally difficult, if not impossible, to arrange the optical fibers so that no matter where the color modulated light beam strikes on end 26 it will strike an equal number of optical fibers of each of smaller bundles 20, 21 and 22. Thus, without lens 18 the light output from colored filters 23, 24 and 25 is not properly modulated in response to the color of the point on film frame 15 through which the point beam of light is passing at each moment in time. To overcome this problem Fresnel lens 18 is used to expand the point light passing through film strip 11 and impinging upon lens 18 to a larger area guaranteeing that the end of each optical fiber of the input end 26 of optical fiber bundle 19 is totally illuminated at all times by whatever color modulated light strikes lens 18.

While the small area 14 being rater scanned on film frame 15 is moved around frame 15 or any other frame of film strip 11 to achieve the moving map display operation, to assure that the light being expanded by lens 18 continues to impinge on all optical fibers of input end 26 of bundle 19, lens 18 is moved in the Y coordinate direction at the same time both flying spot scanner 12 and imaging lens 13 are being moved in the Y coordinate direction. However, lens 18 is only moved a proportional amount of the distance that both flying spot scanner 12 and condenser lens 13 are moved. This is represented by the arrow marked KY in FIG. 1. The servo mechanism utilized to move lens 18 in the Y direction is not shown but those skilled in the art can provide such a servo mechanism without undue experimentation.

Figure 2:
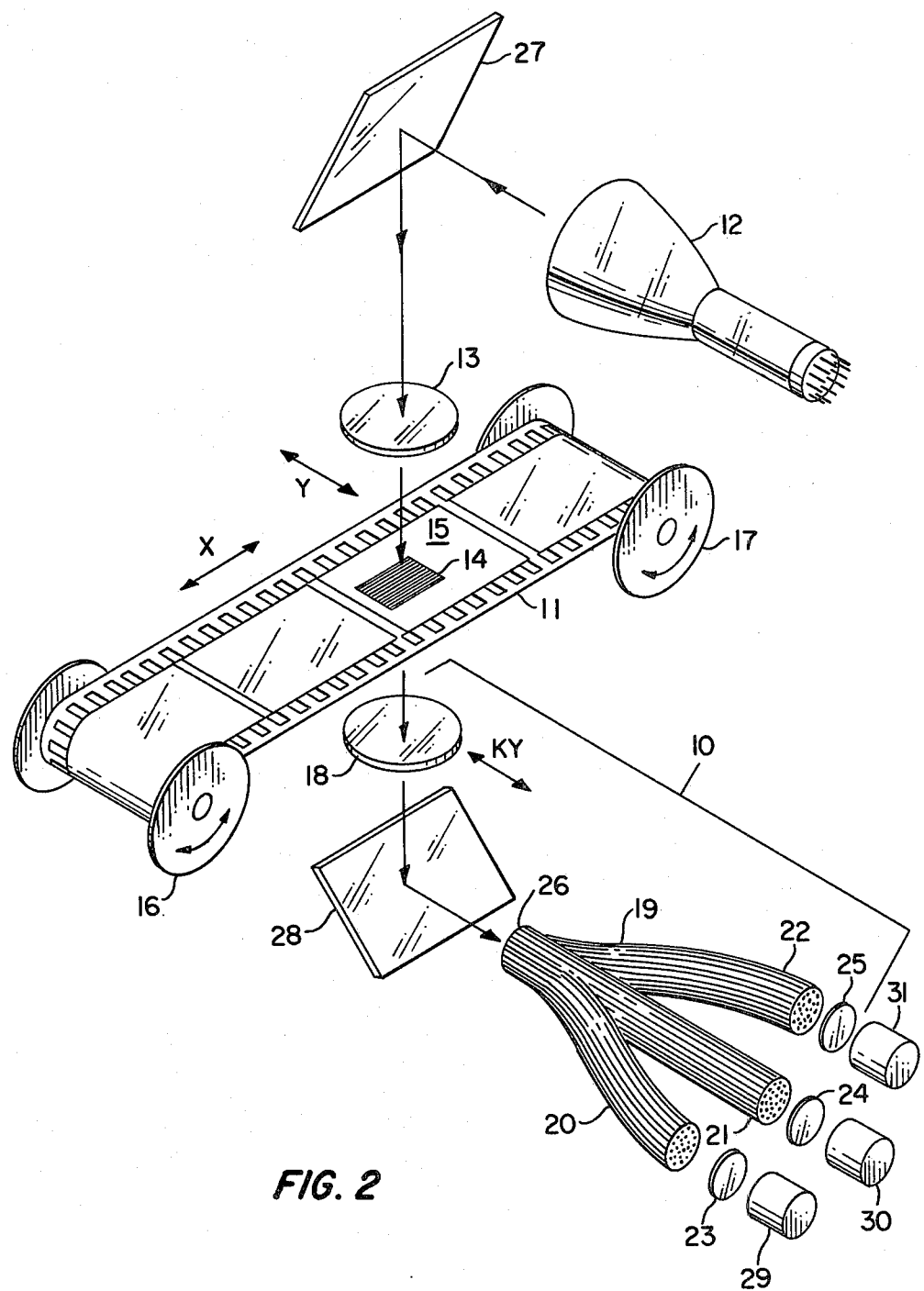
FIG. 2 shows a more practical film scanning arrangement utilizing our novel color separator.

Of the essentially equally divided light exiting smaller bundles 20, 21 and 22 only red light passes through color filter 23, while only green light passes through color filter 24 and only blue light passes through color filter 25. The colored light exiting through each of colored filters 23, 24 and 25 collectively indicate the color of a particular spot on film frame 15 being scanned at any particular moment in time. The colored light signals output from colored filters 23, 24 and 25 must be amplified and converted into electrical signals which are then used to make up the color television type signal used to drive the color display in the cockpit of the aircraft. The light signals are amplified and converted to electrical signals by photomultipliers which are not shown in FIG. 1 but which are shown in FIG. 2 as photomultipliers 29, 30 and 31. Photomultipliers 29, 30 and 31 operate in a manner well known in the art. Without lens 18 severe uniformity requirements are also imposed on the photosensitive surface of photomultipliers 29, 30 and 31 that significantly increases their cost if in fact acceptable performance can ever be achieved.

In FIG. 2 is shown an alternative physical arrangement of the equipment shown in FIG. 1. This alternative physical arrangement is made possible by the use of mirrors 27 and 28 and provides for a more compact arrangement of the equipment. With this organization of the elements the scanning beam generated by flying spot scanner 12 is reflected off mirror 27, is focused by imaging lens 13, scans area 14 of film frame 15 on film strip 11 and is color modulated as it passes therethrough. The scanning beam now modulated with color information passes through Fresnel lens 18 and is reflected off mirror 28 before striking the input end 26 of optical fiber bundle 19. As previously described the light beam is then equally divided between smaller bundles 20, 21 and 22. The output of each of these smaller bundles is respectively filtered by colored filters 23, 24 and 25 to break up the scanning light signal into the red, blue and green color components which are converted into an electrical signal by photomultipliers 29, 30 and 31 and then further processed to create a raster scan type color television signal. To further implement compact physical arrangements optical fiber bundle 19 and its smaller bundles 20, 21 and 22 may be bent without affecting the operation of the system.

It would be obvious to those skilled in the art that other physical configurations of our novel invention may be implemented utilizing other optical elements. In addition, a film strip need not be utilized but rather color slides may be used. Whether slides, film or other translucent means are utilized upon which is recorded in color maps, pictures, tabular information or anything else, our invention may be utilized to separate whatever number of colors are necessary to create a television type color signal for displaying the information on a raster scan monitor; or to create other types of signals to drive for example a stroke writing display. In addition, our invention may also be utilized with color displays utilizing other than color cathode ray tubes as a monitor. Further, translucent means are not required, as the scanning light beam may be reflected from the information storage means to be color modulated and then the colors are separated.

What we claim is:

1. A color separator for a color display video generator wherein a point beam of light is used to scan means upon which information is stored in color to thereby be modulated with color information creating an optical signal representing said information and the color separator separates the optical signal into different colors which are then processed by the video generator into a video signal which is used to display the information on a color display, and wherein the color separator comprises:

means upon which the color modulated point beam of light impinges and is expanded to larger than said point, light conducting means to which said expanded light beam is input for transmission therethrough, the output of said light conducting means being divided into a plurality of outputs, and a plurality of filters each passing light of a different color, one of said plurality of filters being located at each of said plurality of outputs and cooperates therewith such that the color modulated light passing through said light conducting means is divided into different colors as it is output from the combination of individual ones of said plurality of outputs and a color filter.

2. A color separator for a color display video generator wherein a point beam of light is used to scan selected portions of an information storage means in the form of film on which is stored information in color to modulate the light beam with color information creating an optical signal representing said information and th color separator separates said optical signal into different colors which are then processed by the video generator into a video signal which is used to display the information on a color display, and wherein said color separator comprises:

means upon which the point beam of light passing through said film and being color modulated impinges and is expanded to larger than said point, a bundle of optical fibers on one end of which said expanded light beam impinges on substantially all of said optical fibers for transmission therethrough, the other end of the optical fibers making up said bundle being divided into a plurality of smaller bundles each having substantially the same number of optical fibers, and a plurality of filters each passing light of a different color, one of said plurality of filters being located at the end of each of said smaller bundles of optical fibers and cooperating therewith such that the light passing through said film is divided into different colors as it exits each smaller bundle and optical filter combination.

3. The invention in accordance with claims 1 or 2 wherein said means for expanding said point beam of light comprises an optical lens called a field lens which expands the point beam of light exiting therefrom and redirects it onto said one end of said bundle of optical fibers even though said point beam of light scans different portions of said information storage means.

4. The invention in accordance with claims 1 or 2 wherein said optical lens comprises a Fresnel lens.

5. The invention in accordance with claims 1 or 2 wherein said point beam of light is moved to a particular position to scan a predetermined area of said information storage means and cause the display of only the information in said area and wherein said means for expanding said point beam of light comprises an optical lens which is moved at the same time as said point beam of light is moved to scan a particular area to cause said expanded light exiting from said optical lens to substantially impinge upon all the ends of said optical fibers making up said one end of said bundle.

6. A color video display generator comprising:
   a film on which is recorded information in color,
   means for scanning selected portions of said film with a point beam of light to read out said information recorded thereon,
   an optical lens upon which the point beam of light passing through said film and being color modulated impinges and is expanded to larger than said point.
   a bundle of optical fibers on one end of which said expanded light beam impinges on substantially all of said fibers for transmission therethrough, the other end of the optical fibers making up said bundle being divided into a plurality of smaller bundles with each smaller bundle having substantially the same number of optical fibers,
   a plurality of optical filters each passing light of a different color, one of said plurality of optical filters being located at the end of each of said smaller bundles of optical fibers and cooperating therewith such that the color modulated light passing through said bundle of optical fibers is divided into different colors as it exists each smaller bundle and optical filter combination,
   means for converting the different color light exiting from each smaller bundle and filter combination into an electrical signal, and
   means for combining said electrical signals to make up a television type signal which when input to a color television type display displays the information recorded in color on said selected portions of said film.

7. The invention in accordance with claim 6 wherein said optical lens comprises a field lens which expands the color modulated light incident on and passing therethrough and redirects it onto said one end of said bundle of optical fibers even through said point beam of light scans different portions of said film.

8. The invention in accordance with claim 6 wherein said point beam of light is moved to particular positions to scan a specific area of said film and causes the display of only the information recorded in said area and wherein said optical lens comprises a field lens which is moved at the same time as said point beam of light is moved to a particular area to cause said expanded color modulated light exiting from said field lens to substantially impinge upon all the ends of said optical fibers making up said one end of said bundle.

9. The invention in accordance with claims 7 or 8 wherein said optical lens comprises a Fresnel lens.

* * * * *